June 5, 1962 R. L. METZ 3,038,153

DIGITAL-ANALOGUE COINCIDENCE GATE

Filed Sept. 28, 1959

2 Sheets-Sheet 1

INVENTOR.
ROBERT L. METZ
BY Henry L. Shenier
ATTORNEY

June 5, 1962 R. L. METZ 3,038,153

DIGITAL-ANALOGUE COINCIDENCE GATE

Filed Sept. 28, 1959 2 Sheets-Sheet 2

INVENTOR.
ROBERT L. METZ
BY [signature]
ATTORNEY

United States Patent Office 3,038,153
Patented June 5, 1962

3,038,153

DIGITAL-ANALOGUE COINCIDENCE GATE

Robert L. Metz, Milford, Conn., assignor to United Aircraft Corporation, East Hartford, Conn., a corporation of Delaware Filed Sept. 28, 1959, Ser. No. 842,833
8 Claims. (Cl. 340—347)

My invention relates to a digital-analogue coincidence gate and more particularly to a device which provides an output signal whenever the position of a shaft corresponds to a digital input.

In the prior art conventional analogue-to-digital converters have been used which provide a digital code representative of the position of the converter input shaft. The patent of Jack B. Speller No. 2,873,440, issued February 10, 1959, discloses a conventional analogue-to-digital converter of the prior art which provides an unambiguous binary-coded digital representation of shaft position. In order to determine the correspondence of the encoded shaft position and a digital input signal, the prior art has employed comparators of various types. A serial digit-by-digit comparison requires few components; but it is often impractical because of the time required to complete a cycle of digit-by-digit comparison when the signals comprise a large number of bits. A parallel comparator has the advantage of providing an immediate output with no time delay; but such parallel comparator requires a large number of components when the digital signals have a large number of bits. The determination of coincidence has also been obtained by subtracting the digital input signal from the coded representation of shaft position. In the use of subtraction circuitry, coincidence is indicated by a zero output signal of the subtracting circuit. The use of such subtracting circuit does provide an immediate output signal with no time delay, but requires even more components than the parallel comparator.

One object of my invention is to provide a digital-analogue coincidence gate in which no external comparison or subtracting circuit is required.

Another object of my invention is to provide a digital-analogue coincidence gate which immediately and without delay provides a signal whenever a digital input and the position of the shaft coincide.

A further object of my invention is to provide a digital-analogue coincidence gate having few components which is simple and inexpensive to construct.

Other and further objects of my invention will appear from the following description.

In general my invention contemplates the provision of an analogue-to-digital converter similar to that disclosed by Jack B. Speller in Patent 2,873,440. Speller provides two complementary inputs to each circle which are derived from two complementary outputs of the immediately preceding circle. By this cascading effect the tolerances of the pairs of complementary input brushes are successively doubled from circle to circle. Speller employs a pair of diodes associated with the pair of complementary input brushes to prevent adverse cross-feeding of signals from disturbing the proper output representation. I replace each of Speller's diodes by an AND gate having two inputs and providing an output whenever the two inputs coincide. One input of each of the AND gates is the normal internal converter signal which is impressed on the corresponding diode of Speller. The other input of each AND gate is a bit of the digital signal it is desired the converter shaft assume. Thus signals will pass through my coincidence gate only when the internal analogue-to-digital converter signals and the digital input signals correspond. When the digital input and the converter shaft are in correspondence, a low impedance series circuit is completed through the converter.

In the accompanying drawings which form part of the instant specification and which are to be read in conjunction therewith and in which like reference numerals are used to indicate like parts in the various views.

Figure 1:
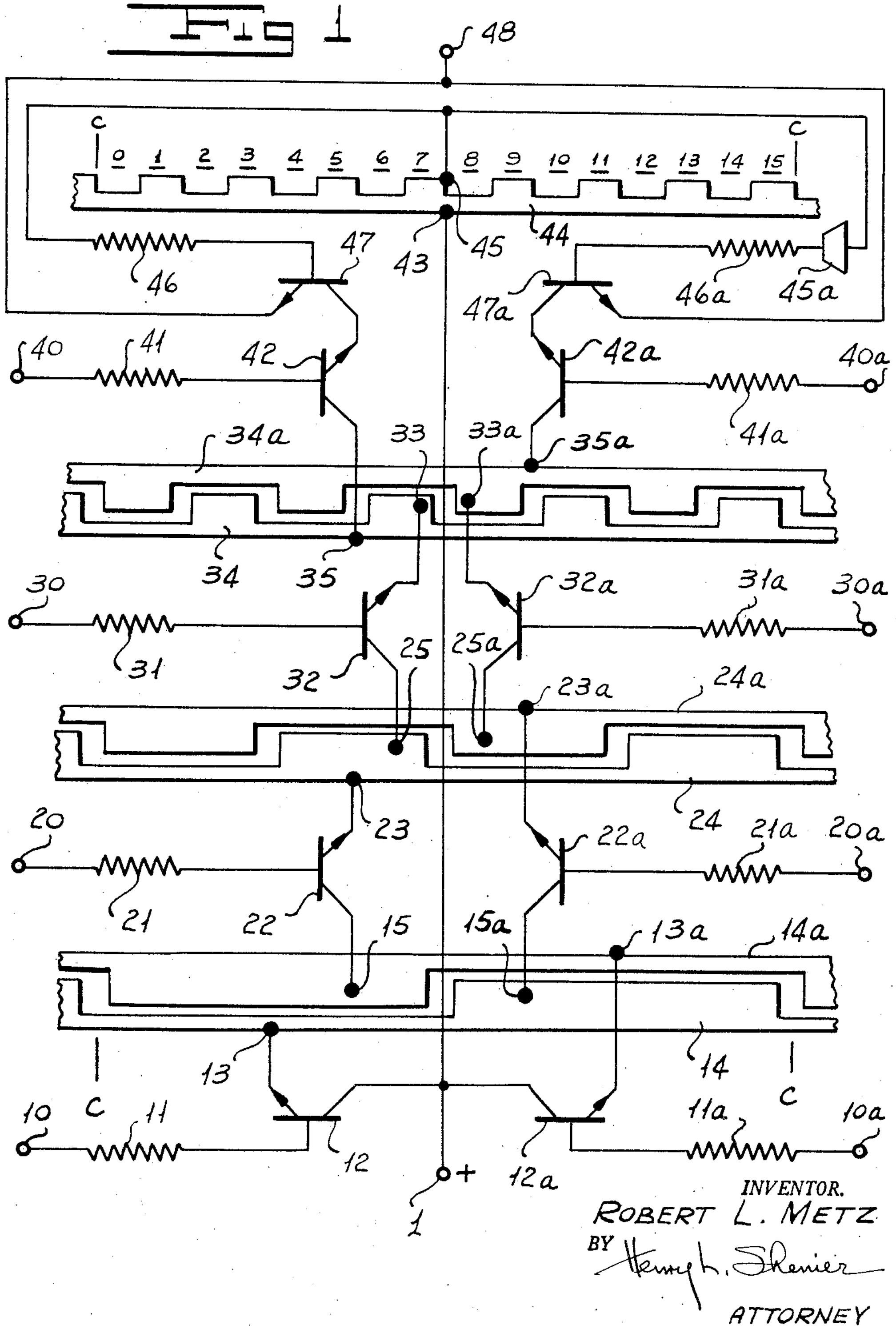
FIGURE 1 is a schematic view of a first embodiment of my digital-analogue coincidence gate in which signals are coupled backwardly through an analogue-to-digital converter.

Referring more particularly now to FIGURE 1, a source of positive potential, terminal 1, is connected to the collectors of n-p-n transistors 12 and 12*a*. The emitter of transistor 12 is connected to a brush 13 which contacts the slip ring of a circle 14 having one segment. The emitter of transistor 12*a* is connected to a brush 13*a* which contacts the slip ring of a circle 14*a* having one segment which intermeshes with that of circle 14. The most significant bit of the digital input, terminal 10, is connected through a resistor 11 to the base of transistor 12. The complement of the most significant bit of the digital input, terminal 10*a*, is connected through a resistor 11*a* to the base of transistor 12*a*. A pair of output brushes 15 and 15*a* are disposed to contact the segments of circles 14 and 14*a* and are spaced apart half the length of the segment of either of these circles. Brushes 15 and 15*a* are connected to the collectors of n-p-n transistors 22 and 22*a*, respectively. The second most significant bit of the digital input, terminal 20, is connected through a resistor 21 to the base transistor 22. The complement of the second most significant bit of the digital input, terminal 20*a*, is connected through a resistor 21*a* to the base of transistor 22*a*. The emitter of transistor 22 is connected to a brush 23 which contacts the slip ring of a circle 24 having two segments. The emitter of transistor 22*a* is connected to a brush 23*a* which contacts the slip ring of a circle 24*a* having two segments which intermesh with those of circle 24. Output brushes 25 and 25*a*, disposed to contact the segments of circles 24 and 24*a*, are spaced apart half the length of a segment of either of these circles. Brushes 25 and 25*a* are connected to the collectors of n-p-n transistors 32 and 32*a*, respectively. The second least significant bit of the digital input, terminal 30, is connected through a resistor 31 to the base of a transistor 32. The complement of the second least significant bit of the digital input, terminal 30*a*, is connected through a resistor 31*a* to the base of transistor 32*a*. Intermeshing circles 34 and 34*a* are each provided with four segments. The emitters of transistors 32 and 32*a* are connected to input brushes 33 and 33*a*, respectively. Input brushes 33 and 33*a* are disposed to contact the segments of circles 34 and 34*a* and are spaced apart half the length of a segment of either of these circles. Output brush 35 contacts the slip ring of circle 34 and is connected to the collector of an n-p-n transistor 42. Output brush 35*a* contacts the slip ring of circle 34*a* and is connected to the collector of an n-p-n transistor 42*a*. The least significant bit of the digital input, terminal 40, is connected through a resistor 41 to the base of a transistor 42. The complement of the least significant bit of the digital input, terminal 40*a*, is connected through a resistor 41*a* to the base of transistor 42*a*. The emitters of transistors 42 and 42*a* are connected to the collectors of n-p-n transistors 47 and 47*a*, respectively. The source of positive potential, terminal 1, is connected to an input brush 43 which contacts the slip ring of a circle 44 having eight segments. An output brush 45 is disposed to contact alternately the segments and intersegmental spaces of circle 44. Output brush 45 is connected through a resistor 46 to the base of transistor 47 and is connected to the input of an inverting or trigger circuit 45a. The output signal of inverting or trigger circuit 45a is complementary to the output signal at brush 45. When brush 45 is at the positive potential of terminal 1, the output of complementing circuit 45a should rest at ground. When brush 45 rests at ground, the output of complementing circuit 45a should be a positive signal equal to that of terminal 1. The output of inverting circuit 45a is connected through a resistor 46a to the base of a transistor 47a. The emitters of transistors 47 and 47a are connected to an output terminal 48. Circles 14 and 14a, 24 and 24a, 34 and 34a, and 44 are concentrically mounted on a nonconductive disk; and the pattern is shown cut radially along line C—C and developed. The converter has a maximum count of 16 and provides the representations 0, 1, 2, . . ., 13, 14, and 15 as indicated by the underlined numerals.

The converter is shown at the transfer point between the counts of 7 and 8. Assume that the digital input at terminals 10, 20, 30, and 40 is 0111 representing the binary coded count of 7. The corresponding complement of the digital input at terminals 10a, 20a, 30a, and 40a is 1000. At terminals 10 through 40 and 10a through 40a, a "1" may be a positive potential equal to that supplied by the input excitation voltage at terminal 1; and a "0" may be ground potential. Thus terminals 40, 30, and 20 are positive, while terminal 10 rests at ground; and terminal 10a is positive, while terminals 20a, 30a, and 40a rest at ground. The positive potential at terminal 10a enables transistor 12a, causing brush 13a and circle 14a to assume the potential of terminal 1. Brush 15 at the position shown contacts the segment of circle 14a and is hence also at the potential of terminal 1. Since terminal 20 is positive, transistor 22 is enabled causing brush 23 and circle 24 to assume the potential of terminal 1. Brush 25 at the position shown contacts a segment of circle 24 and is hence also at the potential of terminal 1. Since terminal 30 is positive, transistor 32 is enabled, causing brush 33 to assume the potential of terminal 1. Since brush 33 contacts a segment of circle 34, brush 35 also assumes the potential of terminal 1. With terminal 40 positive, transistor 42 is enabled, driving the collector of transistor 47 to the potential of terminal 1. If brush 45 contacts the segment of circle 44 subtending the count of 7, then transistor 47 will be enabled; and output terminal 48 will assume the potential of terminal 1, indicating that the shaft position count of 7 is coincident with the digital input of 0111 representing the binary coded count of 7. If, however, output brush 45 lies within the intersegmental space of circle 44 subtending the count of 8, then transistor 47 will not be enabled; and output terminal 48 will rest at ground, indicating that the shaft position count of 8 is not coincident with the digital input of 0111 representing the binary coded count of 7.

If the digital input at terminals 10, 20, 30, and 40 is 1000 representing the binary count of 8, then the corresponding complement at terminals 10a, 20a, 30a, and 40a will be 0111. With terminal 10 positive and with terminals 20a, 30a, and 40a positive, a low impedance path may be traced from terminal 1 through transistor 12 to brush 13 and circle 14, from brush 15a through transistor 22a to brush 23a and circle 24a, from brush 25a through transistor 32a to brush 33a and circle 34a, and from brush 35a through transistor 42a to the collector of transistor 47a. If output brush 45 lies in the intersegmental space of circle 44 subtending the count of 8, then transistor 47a will be enabled; and output terminal 48 will assume the potential of terminal 1, indicating that the shaft position count of 8 is coincident with the digital input of 1000 representing the binary coded count of 8. If, however, output brush 45 contacts the segment of circle 44 subtending the count of 7, then transistor 47a will not be enabled; and output terminal 48 will rest at ground, indicating that the shaft position count of 7 is not coincident with the digital input of 1000 representing the binary coded count of 8.

Figure 2:
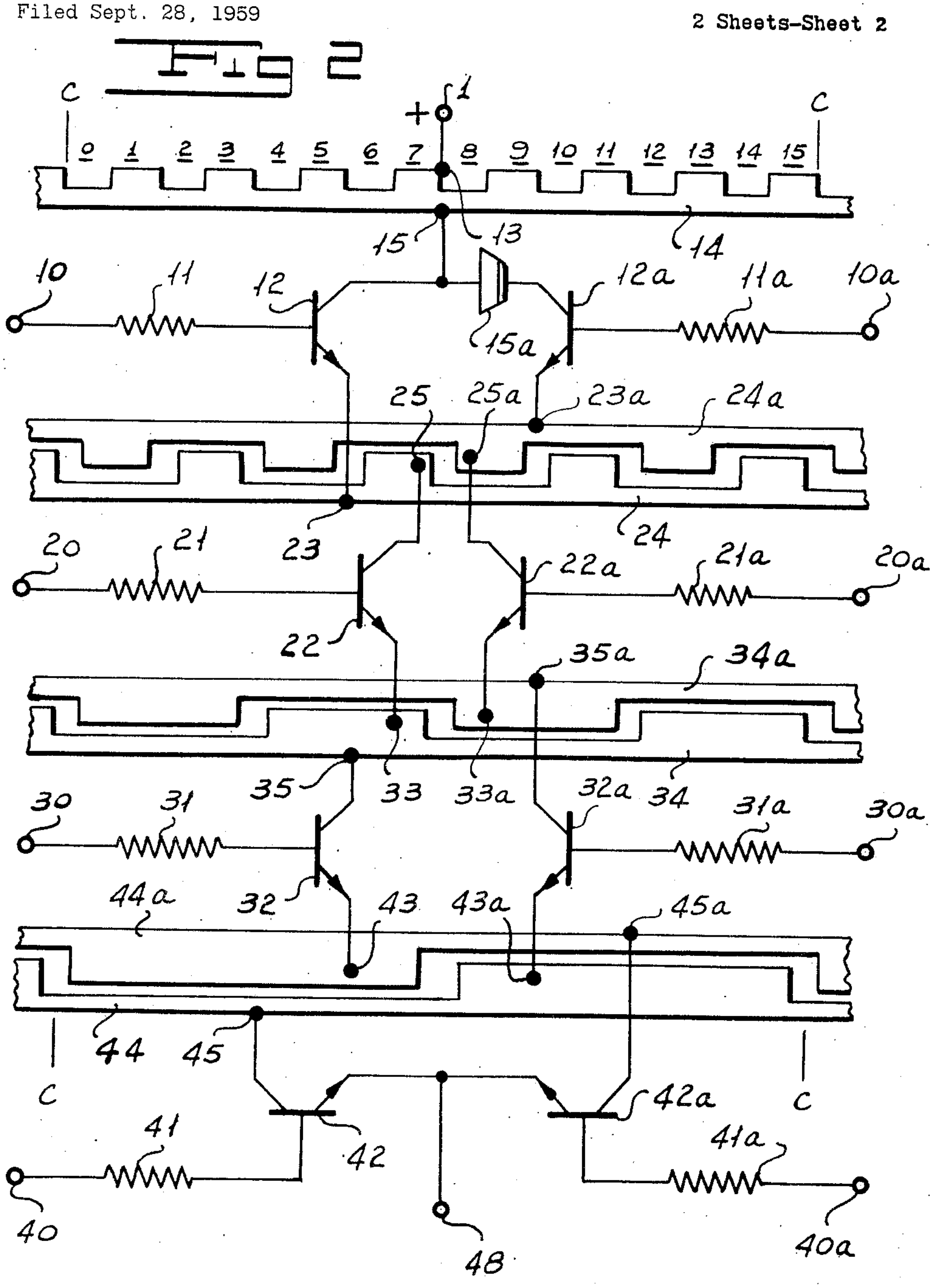
FIGURE 2 is a schematic view of a second embodiment of my invention in which signals are coupled forwardly through an analogue-to-digital converter.

Referring now to FIGURE 2, the source of positive potential, terminal 1, is connected to an input brush 13 which contacts alternately the segments and intersegmental spaces of circle 14. An output brush 15 contacts the slip ring of circle 14 which has eight segments. Output brush 15 is connected to the collector of an n-p-n transistor 12 and is connected to the input of an inverter or trigger 15a. Inverter or trigger 15a should have a low output impedance and provides output signals which are complementary to those at brush 15. When output brush 15 is at the positive potential of terminal 1 by virtue that input brush 13 contacts a segment of circle 14, the output of complementing inverter 15a should rest at ground. When output brush 15 rests at ground by virtue that input brush 13 lies within an intersegmental space of circle 14, the output of complementing inverter 15a should be a positive signal equal to that of terminal 1. The output of inverter 15a is connected to the collector of an n-p-n transistor 12a. The least significant bit of the digital input, terminal 10, is connected through a resistor 11 to the base of transistor 12. The complement of the least significant bit of the digital input, terminal 10a, is connected through a resistor 11a to the base of transistor 12a. The emitter of transistor 12 is connected to a brush 23 which contacts the slip ring of a circle 24. The emitter of transistor 12a is connected to an input brush 23a which contacts the slip ring of a circle 24a. Circles 24 and 24a intermesh and are each provided with four segments. Output brushes 25 and 25a are disposed to contact the segments of circles 24 and 24a and are spaced apart half the length of a segment of either of these circles. Brushes 25 and 25a are connected to the collectors of n-p-n transistors 22 and 22a, respectively. The second least significant bit of the digital input, terminal 20, is connected through a resistor 21 to the base of transistor 22. The complement of the second least significant bit of the digital input, terminal 20a, is connected through a resistor 21a to the base of transistor 22a. Intermeshing circles 34 and 34a are each provided with two segments. The emitters of transistors 22 and 22a are connected to input brushes 33 and 33a, respectively. Brushes 33 and 33a are disposed to contact the segments of circles 34 and 34a and are spaced apart half the length of a segment of either of these circles. Output brush 35 contacts the slip ring of circle 34 and is connected to the collector of an n-p-n transistor 32. Output brush 35a contacts the slip ring of circle 34a and is connected to the collector of an n-p-n transistor 32a. The next to most significant bit of the digital input, terminal 30, is connected through a resistor 31 to the base of transistor 32. The complement of the next to most significant bit of the digital input, terminal 30a, is connected through a resistor 31a to the base of transistor 32a. Intermeshing circles 44 and 44a are each provided with one segment. The emitters of transistors 32 and 32a are connected to input brushes 43 and 43a, respectively. Brushes 43 and 43a are disposed to contact the segments of circles 44 and 44a and are spaced apart half the length of the segment of either of these circles. Output brush 45 contacts the slip ring of circle 44 and is connected to the collector of an n-p-n transistor 42. Output brush 45a contacts the slip ring of circle 44a and is connected to the collector of an n-p-n transistor 42a. The most significant bit of the digital input, terminal 40, is connected through a resistor 41 to the base of transistor 42. The complement of the most significant bit of the digital input, terminal 40a, is connected through a resistor 41a to the base of transistor 42a. The emitters of transistors 42 and 42a are connected to the output terminal 48. The circles 44 and 44a, 34 and 34a, 24 and 24a, and 14 are concentrically mounted on a nonconductive disk; and the pattern is shown cut radially along line C—C and developed. The converter has a maximum count of 16 and provides the representations 0, 1, 2, . . . , 13, 14, and 15 as indicated by the underlined numerals.

The converter is shown at the transfer points between the counts of 7 and 8. Assume that the digital input at terminals 40, 43, 20, and 10 is 0111 representing the binary coded count of 7. The corresponding complement of the digital input at terminals 40*a*, 30*a*, 20*a*, and 10*a* is 1000. Again, a "1" may be a positive potential equal to that supplied by the input excitation voltage at terminal 1; and a "0" may be ground potential. Thus terminals 10, 20, and 30 are positive, while terminal 40 rests at ground; and terminal 40*a* is positive, while terminals 30*a*, 20*a*, and 10*a* rest at ground. With terminals 10, 20, and 30 positive and with terminal 40*a* positive, transistors 12, 22, 32 and also transistor 42*a* are enabled. If input brush 13 contacts the segment of circle 14 subtending the count of 7, then output brush 15 will assume the potential of terminal 1. With transistor 12 enabled, input brush 23 and circle 24 will likewise assume the potential of terminal 1. Since in the position shown output brush 25 contacts a segment of circle 24 and since transistor 22 is enabled, input brush 33 will assume the potential of terminal 1. Since in the position shown brush 33 contacts a segment of circle 34 and since transistor 32 is enabled, input brush 43 will be driven positively to the potential of terminal 1. Since in the position shown brush 43 contacts the segment of circle 44*a* and since transistor 42*a* is enabled, output terminal 48 will be driven positively to the potential of terminal 1. The positive output at terminal 48 indicates that the shaft position count of 7 is coincident with the digital input of 0111 representing the binary coded count of 7. If, however, input brush 13 lies within the intersegmental space of circle 14 subtending the count of 8, then output brush 15 will rest at ground and the output of inverter 15*a* will be positive. Since output brush 15 is at ground potential, no signal is coupled through AND gate transistor 12. Since terminal 10*a* is at ground potential, no signal is coupled through AND gate transistor 12*a*. Thus output terminal 48 will rest at ground, indicating that the shaft position count of 8 is not coincident with the digital input of 0111 representing the binary coded count of 7.

If the digital input at terminals 40, 30, 20, and 10 is 1000 representing the binary count of 8, then the corresponding complement at terminals 40*a*, 30*a* 20*a*, and 10*a* will be 0111. If input brush 13 lies within the intersegmental space of circle 14 subtending the count of 8, then output brush 15 will rest at ground and the output of inverter 15*a* will be a positive voltage equal to that of terminal 1. With terminals 10*a*, 20*a*, and 30*a* positive and with terminal 40 positive, a low impedance path may be traced from the output of inverter 15*a* through transistor 12*a* to input brush 23*a* and circle 24*a*, from brush 25*a* through transistor 22*a* to brush 33*a* and circle 34*a*, from brush 35*a* through transistor 32*a* to brush 43*a* and circle 44, and from brush 45 through transistor 42 to output terminal 48. Output terminal 48 thus assumes a positive potential equal to that of terminal 1, indicating that the shaft position count of 8 is coincident with the digital input of 1000 representing the binary coded count of 8. If, however, input brush 13 contacts the segment of circle 14 subtending the count of 7, then output brush 15 will be positive and the output of inverter 15*a* will rest at ground. No signals will be coupled through either of AND gate transistors 12 and 12*a*. Output terminal 48 will rest at ground, indicating that the shaft position count of 7 is not coincident with the digital input of 1000 representing the binary coded count of 8.

In FIGURE 2 the signals proceed forwardly through the converter from circles of lesser significance to circles of greater significance in the manner taught by Speller with a one-to-one correspondence between transistor AND gates in my invention and the diodes of Speller. In FIGURE 1 the signals proceed backwardly through the converter from circles of greater significance to circles of lesser significance. In FIGURE 2 the active components required are eight transistors and one inverter. In FIGURE 1 the active components required are ten transistors and one inverting circuit. The two additional transistors in FIGURE 1 are 47 and 47*a*. These must be provided because signals cannot be coupled backwardly to the least significant circle in FIGURE 1 which is circle 44. However, the inverting circuit 45*a* in FIGURE 1 may have a high output impedance, while the inverter 15*a* of FIGURE 2 should have a low output impedance. Inverter 15*a* may be provided with such low output impedance by the use of a clamping diode for locking the positive output of the inverter 15*a* to the potential of terminal 1 or by the incorporation into inverter 15*a* of a low output impedance transistor emitter follower. Thus in practice there is little difference between the configurations of FIGURES 1 and 2 in the number of components required.

It will be appreciated by those skilled in the art that the two input connections to any AND gate transistor may be reversed. For example, in FIGURE 1, output brush 15 may be connected through a resistor to the base of transistor 22; and terminal 20 may be directly connected to the collector of transistor 22. In such event, the input at terminal 20 should be of a low impedance. Various other AND gates and AND circuits known to the art may be employed in place of my transistor gates.

It will also be appreciated by those skilled in the art that the roles of any two corresponding pairs of input and output brushes may be reversed. For example, in FIGURE 1 the emitters of transistors 32 and 32*a* may be connected to brushes 35 and 35*a*, respectively; and brushes 33 and 33*a* may be connected to the collectors of transistors 42 and 42*a*, respectively.

It will be seen that I have accomplished the objects of my invention. My digital-analogue coincidence gate requires no external comparison or subtracting circuit. My coincidence gate immediately and without lapse of time provides an output signal whenever the shaft position of an analogue-to-digital converter and a digital input coincide. Because the internal comparison circuitry of my coincidence gate is an integral part of an analogue-to-digital converter, my invention requires fewer components and is simpler and less expensive than coincidence gates of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my inventtion. It is, therefore, to be understood that my invention is not to be limited to the specific details shown and described.

Having thus described my invention, what I claim is:

1. A digital-analogue coincidence gate including in combination a first circle of elements corresponding to digits of a certain significance, a second circle of elements corresponding to digits of a greater significance, first and second input means for one circle, first and second output means for the other circle, a first and a second AND gate each having two inputs and an output, means coupling the first output means to one input of the first AND gate, means coupling the output of the first AND gate to the first input means, means coupling the second output means to one input of the second AND gate, means coupling the output of the second AND gate to the second input means, means providing a pair of complemental signals representing a digit of said certain significance, means coupling one signal to the other input of the first AND gate, and means coupling the other signal to the other input of the second AND gate.

2. A digital-analogue coincidence gate including in combination a first circle of elements corresponding to digits of a certain significance, a second circle of elements corresponding to digits of a greater significance, first and second input means for one circle, first and second output means for the other circle, means including a first AND gate for coupling the first output means to the first input means, means including a second AND gate for coupling the second output means to the second input means, means providing a pair of complemental signals representing a digit of said certain significance, means rendering the first AND gate responsive to one signal, and means rendering the second AND gate responsive to the other signal.

3. A digital-analogue coincidence gate including in combination a first array of elements corresponding to digits of a certain significance, a second array of elements corresponding to digits of a greater significance, first and second coupling means for the first array, third and fourth coupling means for the second array, means including a first AND gate for coupling the first and third means, means including a second AND gate for coupling the second and fourth means, means providing a pair of complemental signals representing a digit of said certain significance, means rendering the first AND gate responsive to one signal, and means rendering the second AND gate responsive to the other signal.

4. A digital-analogue coincidence gate including in combination an array of elements corresponding to digits of a certain significance, means for obtaining a first and a second output from the array, means providing a pair of complemental signals representing a digit of said certain significance, a first AND gate providing a third output, a second AND gate providing a fourth output, means rendering the first AND gate responsive to the first output and to one signal, means rendering the second AND gate responsive to the second output and to the other signal, and means for combining in parallel the third and fourth outputs to provide a coincidence signal.

5. A digital-analogue coincidence gate including in combination a circle of elements corresponding to digits of a certain significance, means including a first pair of AND gates for coupling a pair of inputs to the circle, means including a second pair of AND gates for obtaining a pair of outputs from the circle, means providing a first pair of complemental signals representing a digit of said certain significance, means providing a second pair of complemental signals representing a digit of a lesser significance, means rendering one pair of AND gates responsive to the first pair of signals, and means rendering the other pair of AND gates responsive to the second pair of signals.

6. A digital-analogue coincidence gate including in combination a circle of elements corresponding to digits of a certain significance, first coupling means for the circle including a first AND gate, second coupling means for the circle including a second AND gate, third coupling means for the circle including a third AND gate, fourth coupling means for the circle including a fourth AND gate, means providing a first pair of complemental signals representing a digit of said certain significance, means providing a second pair of complemental signals representing a digit of a lesser significance, means rendering the first AND gate responsive to one signal of the first pair, means rendering the second AND gate responsive to the other signal of the first pair, means rendering the third AND gate responsive to one signal of the second pair, and means rendering the fourth AND gate responsive to the other signal of the second pair.

7. A digital-analogue coincidence gate including in combination a circle of elements corresponding to digits of least significance, means for obtaining a pair of complementary outputs from the circle, a first AND gate, a second AND gate, means providing a pair of complemental signals representing a digit of the least significance, means rendering the first AND gate responsive to one output and one signal, means rendering the second AND gate responsive to the other output and the other signal, and means responsive to the first and second AND gates for providing a coincidence signal.

8. A digital-analogue coincidence gate including in combination a circle of elements corresponding to digits of greatest significance, first and second coupling means for the circle, a first and a second AND gate each having an input terminal and an output terminal, means connecting one terminal of the first AND gate and the corresponding terminal of the second AND gate, means connecting the other terminal of the first AND gate and the first coupling means, means connecting the other terminal of the second AND gate and the second coupling means, means providing a pair of complemental signals representing a digit of the greatest significance, means rendering the first AND gate responsive to one signal, and means rendering the second AND gate responsive to the other signal.

References Cited in the file of this patent

UNITED STATES PATENTS

| | | |
|---|---|---|
| 2,873,440 | Speller | Feb. 10, 1959 |
| 2,892,953 | McVey | June 30, 1959 |